United States Patent [19]
Blatnica

[11] 3,909,049
[45] Sept. 30, 1975

[54] WELDED PIPE FLANGE

[76] Inventor: Joseph R. Blatnica, 1600 Walnut Drive, Chester, Va. 23831

[22] Filed: Jan. 16, 1975

[21] Appl. No.: 541,379

Related U.S. Application Data

[63] Continuation of Ser. No. 367,891, June 7, 1973, abandoned.

[52] U.S. Cl. .................. 285/329; 29/480; 285/416
[51] Int. Cl.² ........................................ F16L 13/02
[58] Field of Search ........... 285/329, 416, 286, 173, 285/405; 29/480, 482, 483

[56] References Cited
UNITED STATES PATENTS

| | | | |
|---|---|---|---|
| 966,870 | 8/1910 | Stoddard | 285/329 |
| 1,291,552 | 1/1919 | Kjerner | 285/416 |
| 1,978,610 | 10/1934 | Straty | 285/286 X |
| 3,608,173 | 9/1971 | Watson et al. | 29/480 X |

FOREIGN PATENTS OR APPLICATIONS

| | | | |
|---|---|---|---|
| 682,597 | 3/1964 | Canada | 285/286 |
| 415,201 | 12/1966 | Switzerland | 285/416 |

*Primary Examiner*—Thomas F. Callaghan
*Attorney, Agent, or Firm*—Griffin, Branigan and Butler

[57] ABSTRACT

A slip-on flange is provided for use in special piping systems such as those handling corrosive agents. The novel slip-on flange is made by forming a conventional flange having an opening therein through which the piping may extend. A recess is formed in the face of the flange surrounding the opening. The recess is then filled with stainless steel or other non-corrosive material fusible with the flange material. The filler material is applied, as by clad welding, so that it extends beyond the face of the flange. The filler material is then machined to produce a joint surface that is raised with respect to the original flange surface. An integral stub may be formed by a similar process wherein the pipe stub is inserted through the opening in the flange before the filler material is applied. After the filler material is applied, the filler material and the end of the pipe are machined in one operation to form a raised joint surface.

4 Claims, 5 Drawing Figures

WELDED PIPE FLANGE

This is a continuation, of application Ser. No. 367,891, filed June 7, 1973, and now abandoned.

BACKGROUND OF THE INVENTION

The present invention relates to slip-on flanges and pipe stubs of the type required in piping systems where contamination, corrosion, or high temperatures and pressures present special problems. The present invention is particularly suitable for use in the chemical and food processing industries wherein contamination of piped materials may result from contact with the piping system, or corrosion of the piping system may result from contact with the piped material.

In many industries, such as those involved in chemical and food processing, exxtensive use is made of stainless steel piping systems because the stainless steel is highly resistant to the corrosive action of chemicals, and because it will not contaminate the material being piped. However, particular problems arise in the connection of stainless steel piping, particularly where the system operates at high temperatures and/or high pressures, hence, flanges made entirely of stainless steel have been employed. These stainless steel flanges are quite expensive to manufacture. But, on the other hand, a conventional carbon steel flange cannot be used because it may corrode and contaminate the material being piped.

SUMMARY OF THE INVENTION

An object of the present invention is to provide a slip-on flange which is relatively inexpensive yet is suitable for use in piping systems which will not corrode and will not contaminate the material being piped.

An object of the present invention is to provide a slip-on flange or stub wherein the flange is comprised primarily of carbon steel but includes stainless steel or another non-corrosive metal in the regions contacted by the piped material.

A further object of the invention is to provide a novel method of making an integral carbon steel and non-corrosive metal flange or stub, the flange or stub comprising non-corrosive metal in the regions contacting the material being piped, and comprising carbon steel in regions not contacting the material being piped, whereby the flange or stub has the strength characteristics of a carbon steel flange or stub and the non-corrosive characteristics of a flange made of the non-corrosive metal. The non-corrosive metal is preferably stainless steel, although any other non-corrosive metals that may be fusible with carbon steel, may be utilized.

In a preferred embodiment, the novel method of forming an integral carbon and stainless steel slip-on flange comprises the steps of forming a flange of carbon steel having a hole extending therethrough with a recess on the face of the flange surrounding the hole, clad welding stainless steel into the recess to build up a stainless steel body extending above the face of the flange, and machining down the stainless steel body to provide a raised joint surface.

Accoording to one aspect of the invention, a stub may be formed by inserting a stainless steel pipe through the hole in theh flange before the stainless steel weld is applied. After the stainless steel weld is applied then the stainless steel and the pipe end are machined down to provide the raised joint surface.

Other objects of the invention will become apparent upon consideration of the following description and the accompanying drawing.

DESCRIPTION OF PREFERRED EMBODIMENTS

Figure 1:
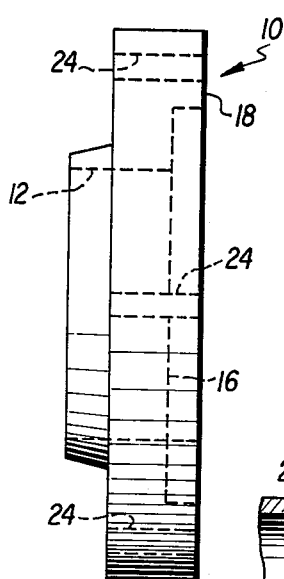
FIG. 1 shows a carbon steel flange formed during an intermediate step in constructing a slip-on flange or stub in accordance with the principles of the present invention.
Figure 2:
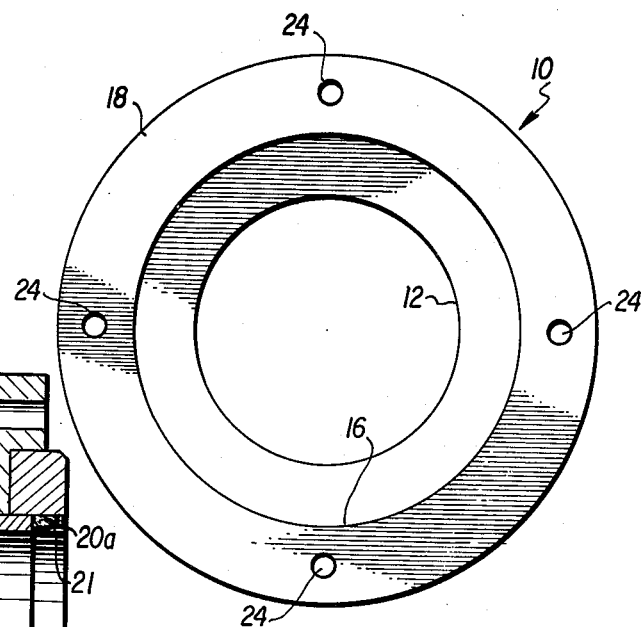
FIG. 2 is a side view of FIG. 1.
Figure 4:
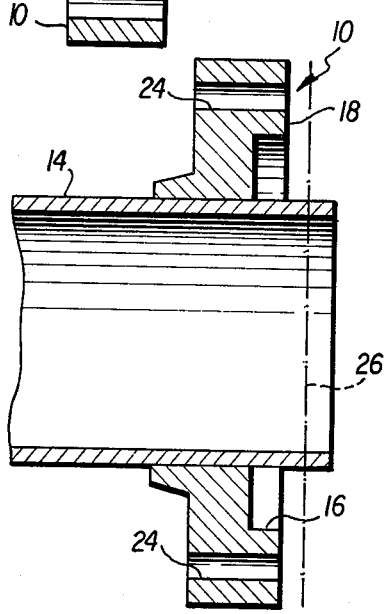
FIG. 4 illustrates an intermediate step in forming an integral stainless steel stub.

In accordance with the principles of the present invention, a slip-on integral carbon steel and stainless steel flange is made by first forming a carbon steel flange like the flange 10 illustrated in FIGS. 1 and 2. The flange 10 is formed by any conventional means and comprises a body having an opening 12 therein through which a stainless steel pipe 14 may be inserted as illustrated in FIG. 4. The flange is provided with a recess 16 in one surface 18, the recess being essentialy an annular recess extending around the opening 12.

The flange illustrated in FIG. 1 differs from flanges of the prior art only by the provision of the recess 16. Thus, the flange of FIG. 1 may be formed merely by machining the recess 16 into the surface 18 of a prior art flange. Alternatively, the flange may be formed by forging, and then machining the opening 12 and recess 16 in a single machining operation.

After the flange 10 is formed, stainless steel weld is applied to the carbon steel surfaces of the recess, the stainless steel being applied until it has a lateral thickness extending beyond the flange face 18. This forms an annular ring 20 of stainless steel, somewhat as illustrated in cross-section in FIG. 3. The welded stainless steel ring has uneven surfaces so a final machining operation is performed, during which the inner surface 20a of the ring is machined to the same diameter as the opening 12, and the raised joint surface 20b is machined down to the required height above the flange surface 18. The raised face 20b is then finished with a serrated, phonographic, or cold finish as is standard in the art.

Figure 6:
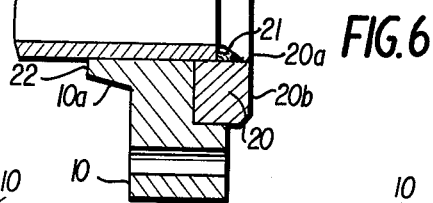
Figure 3:
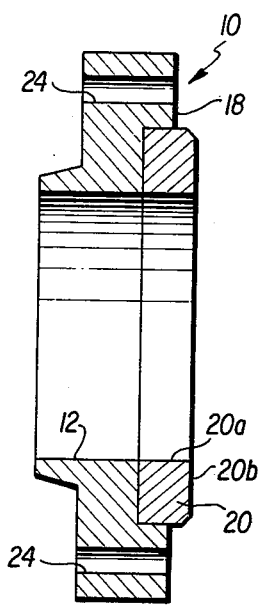
FIG. 3 is a sectional view taken across the diameter of a completed slip-on flange.

The completed slip-on flange, illustrated in FIG. 3, has the same dimensions as a standard flange of the prior art, it being understood that various dimensions may vary depending upon the size of piping, the pressure existing in the piping system, and so forth. The slip-on flange may be utilized by sliding it on over the end of a stainless steel pipe so that the end of the pipe comes in contact with the stainless steel weld at 20a, but does not extend to the finished face 20b, as shown in FIG. 6. A stainless steel weld 21 is then applied to the top or end of the pipe and the inside surface 20a of the integral stainless steel weld 20. This process produces a completely corrosion resistant piping connection. If additional strength of the connection is required, another seal weld or a series of spot welds can be applied to the flange boss 10a and the pipe in the area indicated at 22 in FIG. 6. The flange may be bolted to another flange to provide a coupling between stainless steel pipes, or it may be bolted to a vessel to couple a pipe to the vessel. The flange 10 is provided with a plurality of holes 24 for receiving the securing bolts.

Figure 5:
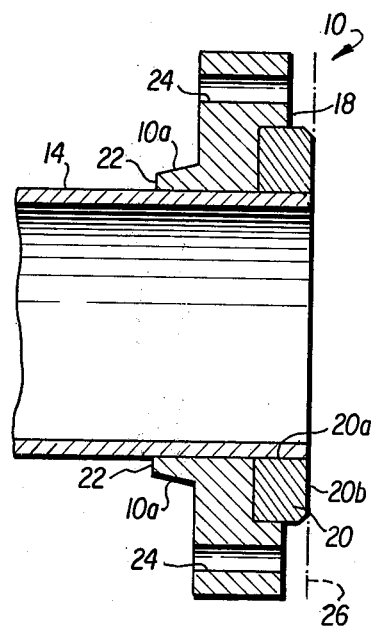
FIG. 5 is a sectional view taken across the diameter of a stub constructed in accordance with the principles of the present invention; and, FIG. 6 is a sectional view of a slip-on flange attached to a pipe.

In accordance with one aspect of the invention, an integral flange and stub may be made by first forming a flange like the flange 10 shown in FIG. 1. Next, a stainless steel pipe stub 14 is inserted through the opening 12 until it extends beyond the imaginary plane 26 (FIG. 4) corresponding to the finished surface 20b. The annular recess is then filled with a stainless steel weld, the stainless steel being applied until it extends past the imaginary plane 26. As a final step, the weld material and the end of the pipe are simultaneously machined down to the plane 26, thus producing a stub as illustrated in FIG. 5.

Regardless of whether the novel flange is employed as a slip-on flange in a stainless steel piping system, or is employed with a stainless steel pipe to form a stub, the end result is that material flowing through pipe 14 cannot contact the carbon steel portion of the flange, but instead contacts only the stainless steel pipe 14 and the stainless steel weld 20. Thus, if corrosive agents are being piped they cannot corrode the carbon steel portion. In like manner, any material being piped cannot be contaminated by the carbon steel portion of the flange as it corrodes.

While a preferred embodiment of the invention may employ stainless steel as the weld material applied to the recess 16, other material so-called "exotic metals", such as platinum, gold, or titanium, may be employed. The only requirement is that the weld material be fusible with carbon steel and be non-corrosive or otherwise suitable for contact with the piped material. Other modifications and substitutions may be made in the above-described preferred embodiment without departing from the spirit and scope of the invention as defined by the appended claims.

The embodiments of the invention in which an exclusive property or privilege is claimed are defined as follows:

1. The combination comprising:
   a carbon steel flange body having a smooth walled cylindrical opening therein through which a first pipe to be joined may be extended;
   said body having an annular recess in the radial end face surrounding said opening; and,
   an integral annular weld of non-corrosive metal deposited in an integral with said flange body at the surface of said recess to fill said recess and to extend axially beyond said face, said integral weld having an annular radial machined, smooth, pipe joint surface that is raised with respect to said face and a machined, smooth cylindrical bore extending therethrough which is coaxial with said opening for receiving said first pipe to be joined.

2. The combination as claimed in claim 1 wherein said integral weld comprises stainless steel.

3. The combination as claimed in claim 1 and further comprising a stainless steel pipe extending through said opening and terminating at the outermost extent of said weld, whereby the end of said pipe and weld are integrally joined and form said raised joint surface.

4. The combination as claimed in claim 3 wherein said integral weld comprises stainless steel.

* * * * *